Feb. 7, 1956    G. W. PAINTER    2,733,596
MEASUREMENT OF DYNAMIC MODULUS OF ELASTOMERS
Filed July 24, 1952

INVENTOR.
Giles W. Painter
BY
Ralph Hammar
Attorney

2,733,596
MEASUREMENT OF DYNAMIC MODULUS OF ELASTOMERS

Giles W. Painter, Erie, Pa., assignor to Lord Manufacturing Company, Erie, Pa., a corporation of Pennsylvania Application July 24, 1952, Serial No. 300,623

6 Claims. (Cl. 73—67)

This invention is intended to measure the dynamic modulus of elastomers, i. e. the elastic modulus and the damping modulus. The measurement of the damping modulus is effected by a vector subtraction method in which an alternating force from a driver of known amplitude and frequency is simultaneously applied to a test specimen whose dynamic modulus is to be measured and to a test standard having negligible damping. The force generated by the deflection of the standard and the force generated by the deflection of the specimen are each separately measured by pick-ups whose outputs are connected in a measuring circuit so the components of the pick-up outputs due to the elastic force can be balanced out leaving only the component of the pick-up output due to the damping force which determines the damping modulus in the test specimen.

Figure 1:
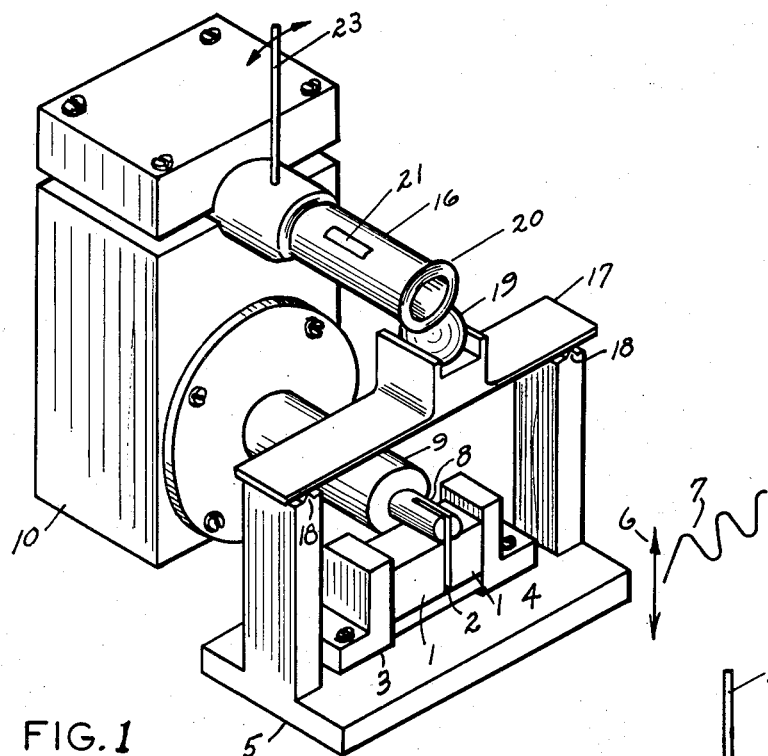
Figure 2:
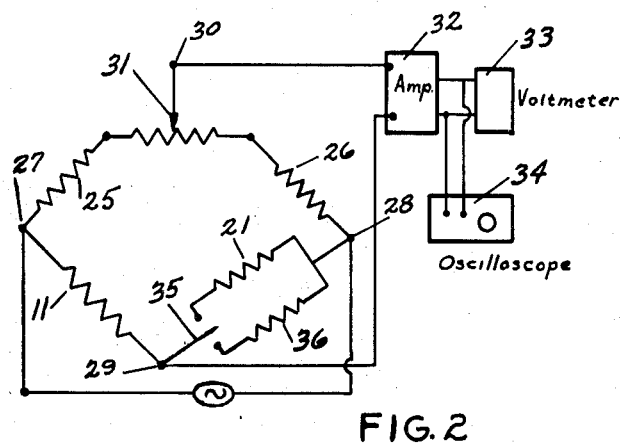
Figure 3:
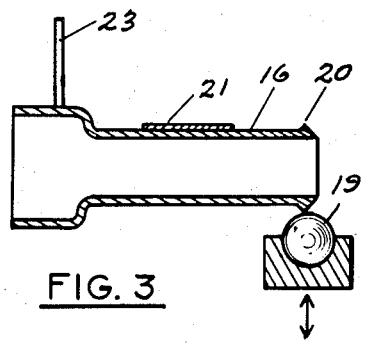
Figure 4:
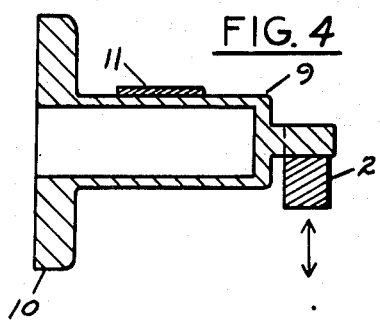
Figure 5:
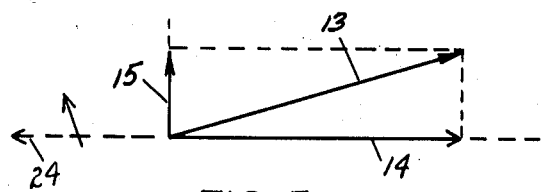

In the accompanying drawing, Fig. 1 is a diagrammatic perspective of the apparatus; Fig. 2 is a circuit diagram; Fig. 3 is a section through the displacement pick-up; Fig. 4 is a section through the force pick-up from the test specimen; and Fig. 5 is a vector diagram.

In Fig. 1, the apparatus is shown set up to measure the shear elastic and damping modulus of elastomers such as natural and synthetic rubbers. For this purpose, the test specimen consists of standard shear sandwiches 1 of the elastomer bonded on opposite sides of a center plate 2 and to end plates 3 and 4 which are respectively fixed to a platen 5 which is provided with a suitable drive (not shown) for vertically reciprocating the platen in the direction of arrows 6 through simple harmonic motion as indicated by the wave shape 7. Ordinarily, both the amplitude of oscillation of the platen as well as its frequency are adjustable.

The center plate 2 of the test specimen is received in a slot 8 on a force pick-up 9 supported in cantilever fashion from a fixed structure 10. The force pick-up is in the form of a thin-walled tube having on its upper surface, the portion of the surface subject to maximum strain, a strain gage 11. This strain gage is of the resistance type and is cemented to the force pick-up 9. As the force pick-up deflects, the strain is carried into the strain gage and appears as a change in resistance. This type of strain gage is well known. The strain appearing in the strain gage 11 will be the strain resulting from the total force applied by the test specimen. As indicated in Fig. 5, the total force 13 is made up of an elastic force 14 in phase with the vibratory movement of the platen 5 and a damping force 15, 90° out of phase with the elastic force. The damping force is responsible for a hysteresis loop rather than a straight line in the force deflection curve.

In order to separate the elastic and damping forces from the total force 13, the strain in the force pick-up 9 is compared to the strain in a displacement pick-up 16, which is responsive to the deflection of a standard steel beam spring 17 simultaneously deflected by the platen 5. The steel beam spring has negligible damping and the force which it applies corresponds almost entirely to its elastic stiffness. The steel beam spring is supported at opposite ends on knife-edge pivots 18 fixed on the platen. At the center of the steel beam spring is a ball 19 which bears on a rim 20 on the tubular displacement pick-up 16, which is supported in cantilever fashion from the fixed structure 10. The displacement pick-up 16 is in the form of a thin-walled hollow tube having a strain gage 21 in the region of the maximum bending movement. More than one strain gage can be used on each pick-up to increase the output. The force applied to the displacement pick-up is directly proportional to the amplitude of vibration of the platen 5 and is in phase with this motion.

In order to vary the effective strain appearing in the strain gage 21, the displacement pick-up can be rotated about its longitudinal axis in the fixed support 10 thereby varying the coupling of the pick-up to the platen. The maximum of strain will appear in the strain gage 21 when this gage is directly in line with the vertical vibratory movement of the platen 5. Minimum or zero strain will appear in the strain gage 21 when this strain gage is rotated 90° from the above position where it will lie on the neutral stress axis. In between, the strain appearing in the gage 21 will be at an intermediate magnitude, but the force producing the strain will be always directly in phase with the vibratory movement of the platen. The voltage produced by the strain gage 21 will undergo a sudden phase shift of 180° as the displacement pick-up is revolved so as to pass the gages through zero strain.

Accordingly, there is produced in the test specimen, a force in phase with the vibratory displacement of the platen 5 and proportional to the elastic modulus of the specimen and, at the same time, there is produced in the test specimen a force 90° out of phase with the displacement of the platen and proportional to the damping modulus of the specimen. In the test standard, the steel beam spring 17, there is produced a force proportional to and in phase with the displacement of the platen 5. By rotating the displacement pick-up 16 in the fixed support 10, the magnitude of the strain appearing in the displacement pick-up can be varied from zero to its maximum appearing when the strain gage 21 is in line with the displacement of the platen 5. Referring to Fig. 5, the voltage generated by the strain appearing in the strain gage 11 corresponds to the vector 13 having components 14 and 15, respectively, in phase with and at right angles to the displacement of the platen 5. The voltage produced by the strain gage 21 is proportional to the dotted arrow 24 which is variable in magnitude by rotating the displacement pick-up 16 in the fixed structure 10 and it can be made to be exactly in phase with the displacement of the platen 5 or 180° out of phase.

It is apparent from Fig. 5 that if the dotted arrow 24, representing the voltage produced by strain gage 21, were adjusted so as to be equal in magnitude to and of opposite sign to the arrow 14 that there would remain only the vector 15 corresponding to the damping modulus of the test specimen.

In the circuit diagram shown in Fig. 2, there is an arrangement for balancing out the strains corresponding to the vectors 14 and 24 so that only the vector 15 will remain. This arrangement comprises a bridge having the strain gage 11 in one arm, the strain gage 21 in another arm, and the remaining two arms comprising fixed resistors 25 and 26. Power is supplied to the bridge through end terminals 27 and 28 and the voltage appearing at mid-terminals 29 and 30 depends upon how closely the bridge is in balance. Under static conditions, when there is no strain in the gages 11 and 21, the bridge is adjusted for balance by the slide contact 31 which comprises one of the mid-terminals of the bridge. Output from the mid-terminals of the bridge is fed through an amplifier 32 alternatively to a voltmeter 33 or to an oscilloscope 34. Under static conditions, the voltmeter 33 will have zero reading.

Under dynamic conditions when the platen 5 is oscillated through a preselected amplitude, the voltmeter 33 will always have some reading and will indicate a voltage which will depend upon the strain produced in the pick-ups and the phase relationship between strains. However, the elastic component of the strains appearing in these gages 11 and 21 will be in phase and by rotating the displacement pick-up 16 so as to change the magnitude of the strain appearing in the gage 21 it is possible to balance out the elastic component of the strains appearing in the gage 11. This is accomplished by turning the force pick-up 16 throughout a range which includes minimum deflection of the voltmeter 33. The point of minimum deflection of the voltmeter 33 will be the point at which the elastic strains represented by the vectors 14 and 24 are balanced out. The voltmeter reading at this minimum point accordingly corresponds to the damping modulus. In order to determine the total modulus of the test specimen represented by the vector 13, which is the vectorial summation of the vectors 14 and 15, the strain gage 21 is cut out of the bridge by turning a switch 35 which cuts in a dummy resistance 36. This dummy resistance balances the resistance of the strain gage 11 under static conditions and accordingly under dynamic conditions the amount of out of balance appearing at the mid-points of the bridge is due to the total dynamic strain in the strain gage 11. This total dynamic strain appears in the voltmeter 33 as a numerical reading. By these two procedural steps, there have been obtained a voltmeter reading corresponding to the damping modulus represented by the vector 15 and a voltmeter reading corresponding to the total modulus represented by the vector 13. From these two readings, the elastic modulus 14 can be quickly calculated.

The calibration of the instrument is carried out by substituting a steel spring of known stiffness for the test specimen 1 and by moving the switch 35 so as to connect the dummy resistance 36 to the other arm of the bridge. Then, by displacing the platen 5 through a known amplitude, a signal is fed to the voltmeter 33 which corresponds to the known force supplied by the deflection of the steel spring. This serves to calibrate the reading of the voltmeter 33 so that the voltmeter readings will be translated directly to stiffness.

The apparatus is almost wholly responsive to the fundamental frequency of the vibration of the platen. Higher harmonics, which might affect accuracy of measurement, are ordinarily sufficiently small so as to make their effect on the voltmeter reading negligible. In case it is desired to measure the dynamic modulus of specimens in tension or compression where there is non-linearity, the amplitude of vibration of the platen should be kept low enough so that the non-linearity will not introduce higher harmonics having excessively high amplitudes. Alternatively, the higher harmonics could be filtered out or a wave analyzer could be used in conjunction with the oscilloscope so as to determine a precise nature of the forces in the test specimen.

What is claimed as new is:

1. Apparatus for measuring the dynamic modulus of elastomers and the like comprising a vibratory driver, a test standard of a material of negligible damping, means for coupling the test standard directly to the driver, a resilient member coupled to the test standard to resist movement of the test standard by the driver and to be strained in phase with the deflection of the test standard, a resistance type strain gage on the member measuring the strain therein caused by the deflection of the test standard, another resilient member equipped with another resistance type strain gage for measuring the strain therein, a test specimen arranged between said other member and the driver so as to strain said other member with a component of strain in phase with the driver proportional to the elastic modulus of the test specimen and with a component of strain out of phase with the driver proportional to the damping modulus of the test specimen, and a strain measuring circuit for balancing out the in phase resistance of the strain gages whereby the indication of said measuring circuit is that due to the out of phase strain component proportional to the damping modulus of the test specimen.

2. Apparatus for measuring the dynamic modulus of elastomers and the like comprising a vibratory driver, a test standard of a material of negligible damping, means for coupling the test standard directly to the driver, a resilient member coupled to the test standard to resist movement of the test standard by the driver and to be strained in phase with the deflection of the test standard, a resistance type strain gage on the member measuring the strain therein caused by the deflection of the test standard, another resilient member equipped with another resistance type strain gage for measuring the strain therein, a test specimen arranged between said other member and a part directly coupled with the driver so as to strain said other member with a component of strain in phase with the driver proportional to the elastic modulus of the test specimen and with a component of strain out of phase with the driver proportional to the damping modulus of the test specimen, a bridge circuit having in one arm the strain gage of the member strained by the test standard and in another arm the strain gage of the member strained by the test specimen, and means for varying the magnitude of the strain in the strain gage on the member strained by the test standard to determine the point of minimum out of balance of the bridge corresponding to the damping modulus of the test specimen.

3. The apparatus of claim 2 in which the member strained by the test standard comprises a cylindrical cantilever beam rotatably carried in a fixed support and having its free end resisting movement of the test standard, the strain gage being mounted on the cylindrical beam so as to be rotatable therewith from a position in line with the movement of the test specimen to a position 90° from the in line position so as to thereby vary the magnitude but not the phase of the strain reflected in the strain gage.

4. Apparatus for measuring the dynamic modulus of elastomers and the like comprising a vibratory driver, a test standard of a material of negligible damping, means for applying a deflecting force from the driver to one part of the test standard while restraining another part of the test standard to produce a deflection in the test standard between said parts in phase with the driver, a pick-up element coupled to the test standard and having an output responsive to the amplitude of displacement of the test standard, a test specimen, means for connecting the driver to one part of the test specimen to cause said one part to move in unison with the driver while restraining another part of the test specimen to produce a deflecting force in the test specimen between said parts, another pick-up element responsive to said deflecting force of the test specimen and displaced with a component in phase with the driver proportional to the elastic modulus of the test specimen and with a component out of phase with the driver proportional to the damping modulus of the test specimen, means for varying the coupling between the driver and the first pick-up to thereby vary the magnitude, but not the phase of the output, and a measuring circuit utilizing the output of the first pick-up to balance out the in phase component of the output of the other pick-up whereby the remaining output of the other pick-up is that due to the out of phase component of the output proportional to the damping modulus of the test specimen.

5. Apparatus for measuring the dynamic modulus of elastomers and the like comprising a vibratory driver, a test standard of a material of negligible damping, means for deflecting the test standard in phase with the driver, a pick-up connected to the test standard so as to be strained by the deflection of the test standard and having an output responsive to the amplitude of deflection, a test specimen, means for connecting the driver to one part of the test specimen to cause said part to move in unison with the driver while restraining another part of the test specimen to produce a deflecting force in the test specimen between said parts, another pick-up element responsive to said deflecting force of the test specimen and displaced with a component in phase with the driver proportional to the elastic modulus of the test specimen and with a component out of phase with the driver proportional to the damping modulus of the test specimen, a bridge circuit having in one arm the output of the test standard pick-up and in another arm the output of the test specimen pick-up, and means for varying the coupling of the driver to the test standard pick-up to vary the magnitude but not the phase of the output of the test standard pick-up to determine the point of minimum out of balance of the bridge corresponding to the damping modulus of the test specimen.

6. In a system containing a vibrated flexible material, means for vibrating one part of the material, means for restraining another part of the material to produce a deflection in said material between said parts, a sensitive element having a value responsive to the vibratory force applied to the restraining means by said vibrating means, which includes a component in phase with the vibrating means proportional to the elastic modulus of the material and a component out of phase with the vibrating means proportional to the damping modulus of the material, another element having a value responsive to the amplitude and in phase with said vibrating means, and means for balancing the values of said elements in subtractive relation to produce a resultant value in which the component proportional to the elastic modulus of the material is balanced out.

References Cited in the file of this patent
UNITED STATES PATENTS

| | | |
|---|---|---|
| 1,880,425 | Flanders | Oct. 4, 1932 |
| 2,150,377 | Keinath | Mar. 14, 1939 |
| 2,316,253 | Keinath | Apr. 13, 1943 |
| 2,355,194 | Wiggins | Aug. 8, 1944 |
| 2,568,596 | Ruge | Sept. 18, 1951 |